US 6,591,181 B2

(12) United States Patent
Hellmann et al.

(10) Patent No.: US 6,591,181 B2
(45) Date of Patent: Jul. 8, 2003

(54) METHOD AND DEVICE FOR SETTING THE VEHICLE LONGITUDINAL VELOCITY TO A DEIRED SPEED

(75) Inventors: Manfred Hellmann, Hardthof (DE); Hermann Winner, Karlsruhe (DE); Ralph Lauxmann, Korntal-Muenchingen (DE); Albrecht Irion, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 10/018,725
(22) PCT Filed: Apr. 3, 2001
(86) PCT No.: PCT/DE01/01262
§ 371 (c)(1),
(2), (4) Date: Apr. 11, 2002
(87) PCT Pub. No.: WO01/79017
PCT Pub. Date: Oct. 25, 2001

(65) Prior Publication Data
US 2002/0138190 A1 Sep. 26, 2002

(30) Foreign Application Priority Data
Apr. 17, 2000 (DE) .......................................... 100 19 181

(51) Int. Cl.<sup>7</sup> ............................................... B60K 26/00
(52) U.S. Cl. ........................... 701/96; 180/179; 701/93
(58) Field of Search ............................ 701/96, 93, 98, 701/94, 300, 301; 180/170–179

(56) References Cited

U.S. PATENT DOCUMENTS 5,979,582 A   11/1999   Hakansson et al.

FOREIGN PATENT DOCUMENTS

| DE | 43 38 399 | 5/1995 |
| DE | 196 27 727 | 1/1998 |
| EP | 1 020 316 | 7/2000 |

OTHER PUBLICATIONS

"Adaptive Cruise Controls—System Aspects and Development Trends" by Winner, Witte et al., published at SAE 96, Feb. 26–29, 1996 in Detroit (SAE paper No. 961010)**.

Primary Examiner—Richard M. Camby
(74) Attorney, Agent, or Firm—Kenyon & Kenyon

(57) ABSTRACT

A method and a device are for setting the longitudinal speed of a vehicle to a setpoint speed, in particular on the basis of a regulation, having controllable brakes. In operation of a cruise control system, the cruise control may be activated when the instantaneous driving speed is significantly higher than a stored setpoint speed. In this situation, there may be unwanted braking responses by the regulator, which may endanger the driver and the following road users. In such a situation, the method prevents a breaking measure from being implemented and ensures that the vehicle will coast, being braked only by the road resistance and the drag on the engine, until reaching the set speed. The driving response of the cruise control system approximates that of a human driver, so the responses of the automatic cruise control seem more intelligible for the driver.

16 Claims, 3 Drawing Sheets

METHOD AND DEVICE FOR SETTING THE VEHICLE LONGITUDINAL VELOCITY TO A DEIRED SPEED

FIELD OF THE INVENTION

The present invention relates to a method and a device for setting the longitudinal speed of a vehicle to a setpoint speed, in particular on the basis of a regulation, having controllable brake units.

BACKGROUND INFORMATION

The basic functioning of methods and devices for regulating the speed or acceleration is referred to as adaptive cruise control (ACC). A basic description of such a device and such a method can be found, for example, in the article "Adaptive Cruise Controls—System Aspects and Development Trends" by Winner, Witte et al., published at SAE 96, Feb. 26–29, 1996 in Detroit (SAE paper no. 961010).

Such a method and device are also described, for example, in German Published Patent Application No. 196 27 727, in which resuming regulation at an original setpoint speed is delayed by the driver in at least one operating mode. If, when regulation is resumed, the vehicle speed is greater than the stored setpoint speed, then, due to the time lag in resumption, the driver has an opportunity to adjust the setpoint speed to prevent an unwanted braking response.

German Published Patent Application No. 43 38 399 describes a method and a device that work together to regulate or limit driving speed. In this method, an estimate is made to determine whether a reduction in engine power will be sufficient to maintain a setpoint speed. If closing the throttle valve is not sufficient to decelerate the vehicle so that the setpoint speed is maintained, then, optionally, the braking power may be increased. This method is used to maintain driving speed at the setpoint speed, without having to operate the brakes by the brake pedal.

With conventional cruise control systems, in most cases only the throttle valve is controlled to regulate the actual speed of the vehicle at a setpoint speed. In isolated cases, there are conventional cruise control systems that can control the brake systems and can thus maintain a constant speed, even in downhill driving.

In vehicles with adaptive cruise control, both the throttle valve and the brake may be controlled, depending on the given situation. In an ACC system, this is done as a function of the speed or the distance from the vehicle in front, depending on whether the vehicle is in distance control mode or speed control mode. In the case when the vehicle is in speed control mode, i.e., no vehicle is within the sensor sight range in front, the setpoint speed is the same as the set speed selectable by the driver. In the case when the vehicle is in distance control mode, i.e., one's own vehicle is following a vehicle in front, the driving speed approaches the setpoint speed. Therefore, in these ACC systems, braking may be performed automatically when the longitudinal speed of the vehicle is greater than the set speed. There are situations in which these regulating responses, in the form of braking measures, are undesirable and would frighten and even endanger both the driver and the following traffic.

This situation occurs in particular when the vehicle speed is significantly higher than the stored set speed, and the driver operates the resume button to reactivate the cruise control. Another situation in which this response can occur is when the driver steps on the gas pedal while ACC regulation is active and thus accelerates the vehicle to a significantly higher speed than the set speed. At the moment when the driver lets off the gas pedal again and the vehicle speed is still far above the set speed, the ACC regulation resumes and the vehicle is braked to the set speed, although the driver is not expecting this response.

SUMMARY

The present invention may conform ACC control to the driving response of a skillful and experienced driver, so that in the situations described above, the system will respond differently than in normal operation. It is an object of the present invention to omit the control of brake units as long as there is no termination criterion, such as an obstacle detected in the predicted path range of the regulated vehicle or a time limit being exceeded, in particular in the special cases of resumption of cruise control and driver override in the case when the vehicle speed is higher than the set speed.

In an example method and device according to the present invention, the response of a natural driver in these special situations is simulated, thus avoiding unexpected and unnecessary braking maneuvers, which may frighten and endanger road users.

DETAILED DESCRIPTION

Figure 1:
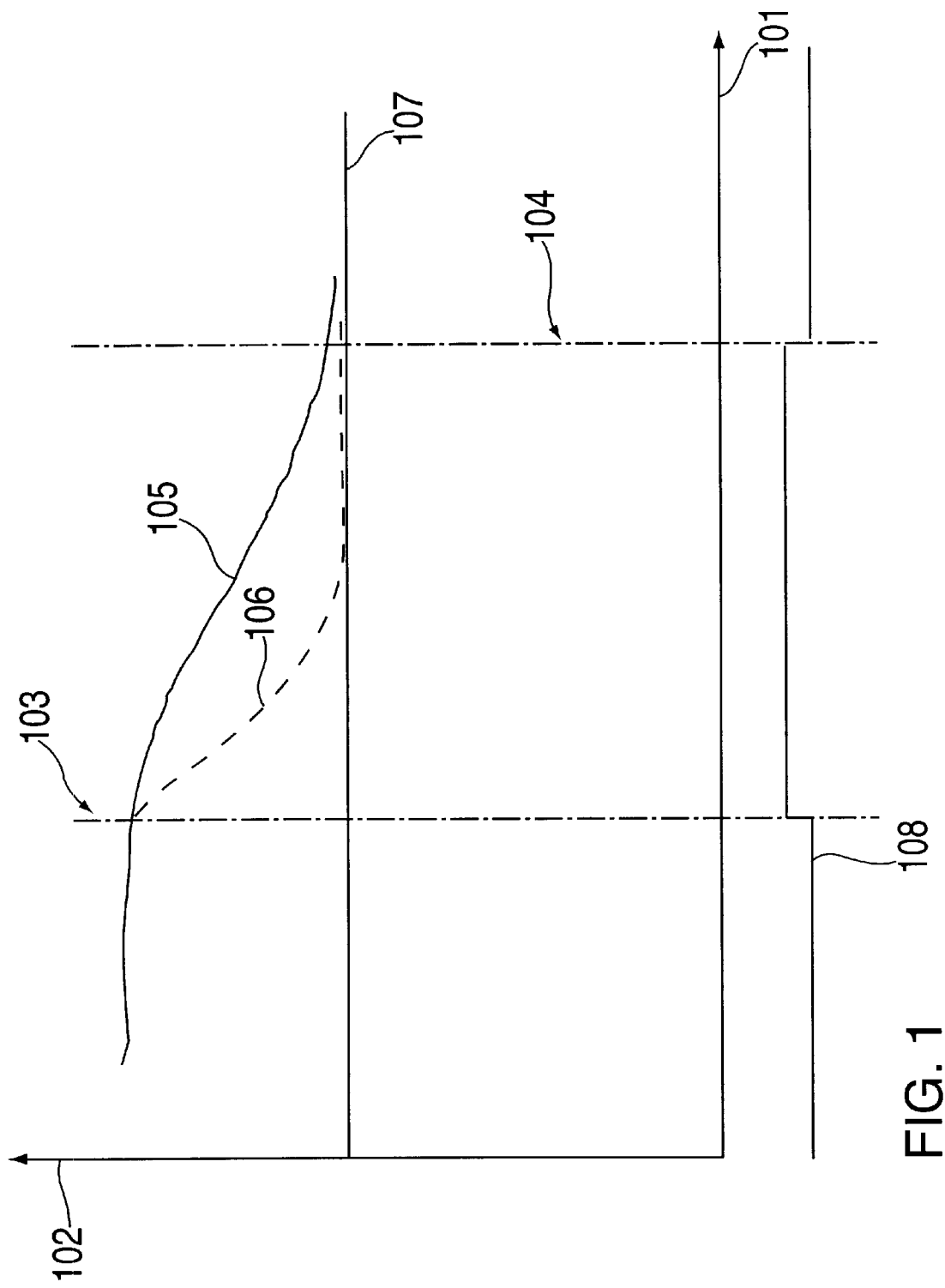
FIG. 1 is a v-t diagram, in which the longitudinal speed of a vehicle is plotted as a function of time for the case when cruise control is resumed by activating the resume-delay function.

FIG. 1 illustrates a speed axis 102 plotted over a time axis 101, thus forming a v-t diagram. Curve 105 illustrates vehicle longitudinal speed vFzg as a function of time, i.e., the speed of the vehicle at time t. Curve 107 illustrates set speed vSet of the adaptive cruise control over time t. The time axis is indicated by line 101. Line 103 represents the time when resumption of cruise control is activated by the driver. FIG. 1 illustrates that before time 103, vehicle speed vFzg 105 is significantly higher than set speed vSet 104. At time 103, resumption of control is activated so the regulation intervenes in the driving process again. Since vehicle speed vFzg is much higher than set speed vSet 107, in the traditional case the regulator operates the brake to set the vehicle to set speed vSet, which thus results in a speed profile such as that represented by broken line 106. In such a situation, a human driver would allow the vehicle to coast until reaching set speed vSet instead of braking to decelerate. To simulate this behavior, braking is suppressed, resulting in a speed profile such as that represented by curve 105.

The time curve of the resume-delay flag is plotted in the lower portion of FIG. 1. Line 108 illustrates the times at which the resume-delay flag has been set, and axis 101 is the time axis.

The resume-delay flag is set at the moment when vehicle longitudinal speed vFzg is significantly greater than set speed vSet and resumption is activated, e.g., by depressing a "resume" key. In this mode, a braking measure is prevented as long as there is no need for it. If a sensor detects an obstacle in the vehicle's lane, then the "resume-delay" flag may be removed and a braking measure may be allowed. The "resume-delay" flag may also be removed when set speed vSet is changed, e.g., when vSet is reduced or when the "resume-delay" mode lasts longer than a maximum preselectable value. In the normal case, the "resume-delay" flag may be withdrawn only if the vehicle longitudinal speed vFzg is less than a preselectable extent above set speed vSet. This time is illustrated in FIG. 1 in line 104, at which "resume-delay" flag 108 is also withdrawn.

Figure 2:
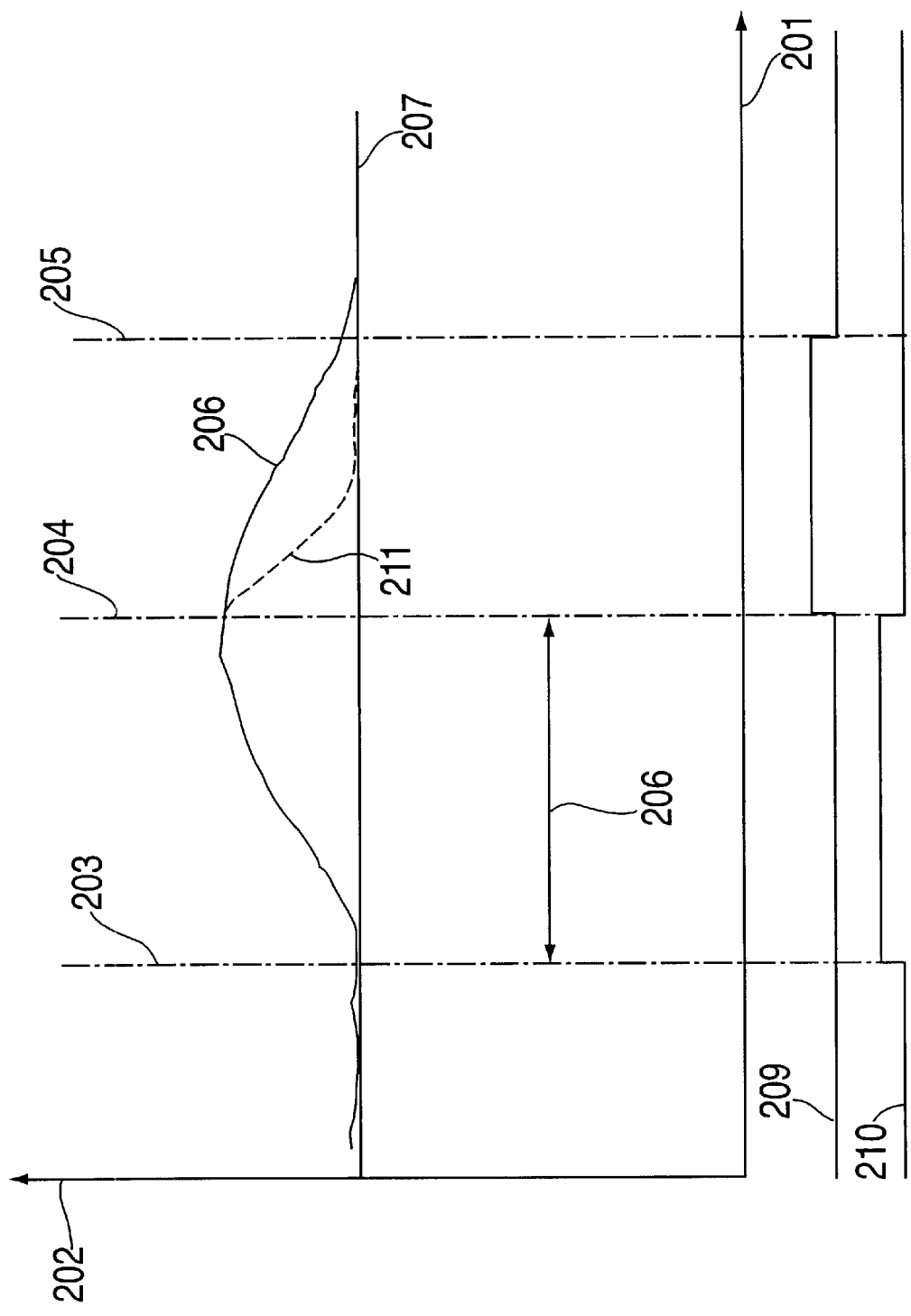
FIG. 2 is a v-t diagram, in which the longitudinal speed of a vehicle is plotted as a function of time for the case of driver override (suspend) by operation of a gas pedal and subsequent deceleration by releasing the gas pedal, thus activating the suspend-delay function.

Another situation in which it is appropriate to prevent a braking measure is when the cruise control is overridden by stepping on the gas pedal and the longitudinal speed of the vehicle is increased significantly in comparison with set speed vSet. This case is described below as a "suspend-delay" function and is illustrated in FIG. 2. FIG. 2, like FIG. 1, is a v-t diagram. The speed axis is 202 and the time axis is 201. Curve 208 represents vehicle longitudinal speed vFzg as a function of time t, and 207 is set speed vSet of the cruise control.

Before time 203, vehicle speed vFzg fluctuates around set speed vSet. At time 203, the gas pedal is operated in the sense of increasing the vehicle speed, so that vehicle speed vFzg is increased significantly in comparison with set speed vSet. The gas pedal remains in operation at time 206, so that the vehicle's speed is increased further in this period of time. At time 204, the gas pedal returns to its original position. In traditional operation, the regulation intervenes again, reducing the speed to set speed vSet by a braking measure, as illustrated by curve 211. Due to the fact that braking is prevented in this situation according to the present invention, the vehicle is braked only by the road resistance and the drag of the engine, so that the speed curve 208 drops, so it declines much more slowly than in the case of curve 211.

At time 205, vehicle speed vFzg has decreased to the extent that vehicle longitudinal speed vFzg is less than a preselectable extent above set speed vSet. As in the "resume-delay" case, this is also one of the termination criteria for the "suspend-delay" case. Other termination criteria include exceeding a time limit for this operating mode, detecting an obstacle in the same lane as the vehicle, a reduction in set speed by operation of an operating element or deactivation of the distance and speed regulation system.

FIG. 2 illustrates in the lower portion two curves 209 and 210, which correspond to the time axis and the v-t diagram. 209 is the "suspend-delay" flag, which is set at time 204 when the regulator intervenes in the speed control again under the condition that the vehicle longitudinal speed is much greater than the set speed. As long as this "suspend-delay" flag is set, braking is prevented until time 205 when this flag is reset because the vehicle speed is no longer sufficiently higher than the set speed. Line 210 illustrates in which periods of time the gas pedal is operated in the sense of a desired acceleration. The gas pedal is operated at time 203 in the sense of increasing speed, it remains activated for time period 206, and it is returned to the starting position at time 204.

For the case when one of these two operating modes— "resume-delay" or "suspend-delay"—is active when driving downhill, a braking measure is provided but it is only as great as required by the gradient, so as not to further accelerate the vehicle.

Figure 3:
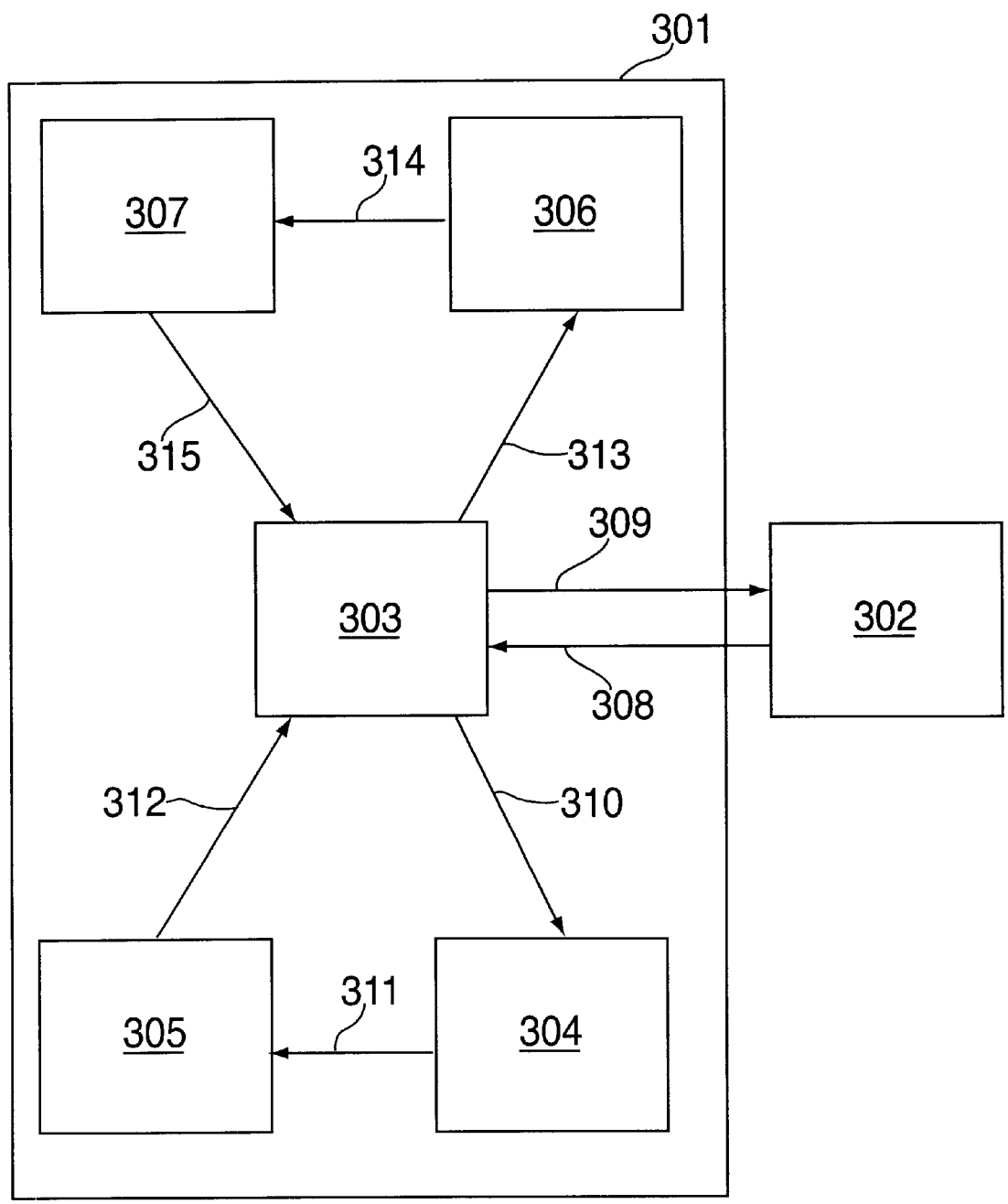
FIG. 3 is a block diagram indicating which conditions and states lead to the resume-delay and suspend-delay operating modes and how they are terminated.

FIG. 3 illustrates the states and transitions such as those occurring with the "resume-delay" and "suspend-delay" modes and how these modes may be canceled again. For example, region 301 indicates an active cruise control system, in contrast with block 302, which indicates the operating mode when the cruise control, which may also be an adaptive cruise control (ACC), has been deactivated. Block 303 within mode 301 represents the normal operating case of the cruise control, also referred to as the first operating mode. Transition 308 from the shutdown state to the active normal operating mode represents activation by an operating element. Conversely, transition 309 indicates deactivation of the cruise control by actuating a shutdown operating element.

Two possible modes may be assumed from mode 303. One is mode 304, which may be reached by transition 310. Transition 310 occurs when the brake pedal has been actuated by the driver, whereupon the cruise control system is deactivated and goes into the "resume" mode. If the operating element for resuming cruise control is actuated in this mode, under the assumption that vFzg>vSet+delta, transition 311 occurs, whereupon "resume-delay" mode 305 is assumed by preventing a braking measure. If vehicle speed vFzg is reduced below vSet+delta, the "resume-delay" mode is canceled and the vehicle is continued in normal regulating mode. The second possible mode that may be assumed from normal operating mode 303 is "suspend" mode 306. If, in normal operating mode 303, the gas pedal is operated in the sense of increasing the speed, the regulating operation is interrupted and vehicle speed vFzg is increased to a value greater than vSet+delta, so transition 313 leads into "suspend" mode 306. If the driver subsequently releases the gas pedal while the speed is still elevated, thus fulfilling transition condition 314, "suspend" mode 306 develops into "suspend-delay" mode 307. Subsequently, the vehicle speed declines again slowly until meeting transition condition 315, which presupposes vFzg<vSet+delta. In this case, the "suspend-delay" mode which prevents braking goes back to normal operating case 303 where a braking measure is provided.

Operating modes 305 and 307 are the two modes which are also referred to as second operating modes. In these two modes, a braking measure is prevented to simulate the driving response of a human driver and thus prevent unexpected regulating responses by the cruise control system. When downhill driving is detected in these two modes 305 and 307, braking is nevertheless performed to prevent acceleration of the vehicle due to negative road resistance.

These two special cases of the "resume" operating mode and the "suspend" operating mode are thus handled in a uniform manner.

A driving response that corresponds to that of a human driver and thus seems logical and reproducible to the driver is provided by the method according to the present invention. The cruise control system may therefore be operated with an optimally adapted operating mode in all situations, so that the driver and the road users following the driver are not exposed to any unnecessary dangers.

What is claimed is:

1. A method for setting a longitudinal speed of a vehicle to a setpoint speed of the vehicle, the vehicle including controllable brake units, comprising the steps of:
   in at least one first operating mode, in which the longitudinal speed of the vehicle exceeds the setpoint speed by a preselectable extent, setting the longitudinal speed of the vehicle to the setpoint speed by controlling the brake units; and
   in at least one second operating mode, in which the longitudinal speed of the vehicle exceeds the setpoint speed by the preselectable extent, setting the longitudinal speed of the vehicle to the setpoint speed without controlling the brake units.

2. The method according to claim 1, further comprising the steps of initiating the second operating mode when the longitudinal speed exceeds the setpoint speed by the preselectable extent and simultaneously operating an operating element for resumption of speed setting.

3. The method according to claim 1, further comprising the step of initiating the second operating mode when the longitudinal speed exceeds the setpoint speed at least by the preselectable extent in accordance with actuation of a device operable by a driver configured to select the speed as a speed increase.

4. The method according to claim 3, wherein the device operable by the driver includes a gas pedal.

5. The method according to claim 1, further comprising the step of terminating the second operating mode when one of the longitudinal speed of the vehicle exceeds the setpoint speed by less than the preselectable extent, a time limit for the second operating mode is exceeded, a driver reduces the setpoint speed by actuating at least one operating element, the driver deactivates a system configured to set the speed by actuating at least one operating element for deactivation of the system, the driver deactivates the system for setting the speed by actuating a braking device, and a distance and speed sensor provided on the vehicle detects an obstacle in a same lane as the vehicle at a distance less than a preselectable distance.

6. The method according to claim 5, wherein the distance and speed sensor includes an ACC sensor.

7. The method according to claim 1, further comprising the step of initiating a braking measure in the second operating mode and in accordance with a simultaneous detection that the vehicle is driving downhill, a delay moment being in accordance with a gradient of a downhill segment of road.

8. The method according to claim 7, wherein the delay moment is in accordance with a negative road resistance being greater than a drag on a vehicle engine.

9. The method according to claim 1, further comprising the step of flagging an occurrence of the second operating mode by one of setting and deleting identifiers in a respective device, different identifiers provided for a "resume-delay" case and a "suspend-delay" case, so that a distinction is made between these two cases.

10. The method according to claim 1, wherein the longitudinal speed is set to the setpoint speed in accordance with a regulation.

11. A device for regulating a longitudinal speed of a first vehicle and a distance of the first vehicle from a second vehicle driving ahead of the second vehicle, comprising:

an arrangement configured to control braking devices;

a predetermined first identifier that indicates a presence of at least one preselectable first operating mode in which the longitudinal speed exceeds the setpoint speed by a preselectable extent and the longitudinal speed is set to the setpoint speed in accordance with control of the braking devices;

a predetermined second identifier that indicates a presence of at least one preselectable second operating mode in which the longitudinal speed exceeds the setpoint speed by the preselectable extent and the longitudinal speed is set to the setpoint speed without control of the braking devices;

an arrangement configured to detect and process an inclination of a road surface in a longitudinal direction of the first vehicle; and a driver operable arrangement configured to activate, deactivate, resume and adjust the setpoint speed of a system configured to set the speed.

12. The device according to claim 11, further comprising an arrangement configured to detect and note an occurrence of the second operating mode one of when the longitudinal speed exceeds the setpoint speed by the preselectable extent and to simultaneously actuate an operating element configured to reactivate the speed setting and when the longitudinal speed exceeds the setpoint speed at least by the preselectable extent in accordance with actuation of an arrangement operable by the driver configured to select the speed as a speed increase.

13. The device according to claim 12, wherein the arrangement operable by the driver configured to select the speed includes a gas pedal.

14. The device according to claim 11, further comprising an arrangement configured to terminate the second operating mode in accordance with a detection that at least one of the longitudinal speed exceeds the setpoint speed by less than the preselectable extent, a time limit on the second operating mode is exceeded, the driver reduces the setpoint speed by actuating an operating element, the driver deactivates the system configured to set the speed by actuating at least one operating element configured one of to deactivate the system and to actuate the braking device, and an obstacle is in a same lane as the first vehicle, a distance to the obstacles less than a preselectable distance.

15. The device according to claim 11, further comprising an arrangement configured to perform a braking measure when the second operating mode prevails and in accordance with a simultaneous detection that the vehicle is driving downhill, a delay moment in accordance with a gradient of a downhill segment of road.

16. The device according to claim 15, wherein the delay moment is in accordance with a negative road resistance being greater than a drag on a vehicle engine.

* * * * *